(No Model.)

J. J. LEVISTON.
COTTON PLOW.

No. 457,650. Patented Aug. 11, 1891.

WITNESSES:
Chas. L. Taylor
Phil C. Masi

INVENTOR
J. J. Leviston
BY E. W. Anderson,
his ATTORNEY.

UNITED STATES PATENT OFFICE.

JOSEPH J. LEVISTON, OF KNOX POINT, LOUISIANA.

COTTON-PLOW.

SPECIFICATION forming part of Letters Patent No. 457,650, dated August 11, 1891.

Application filed February 13, 1891. Serial No. 381,357. (No model.)

*To all whom it may concern:*

Be it known that I, JOSEPH J. LEVISTON, a citizen of the United States, and a resident of Knox Point, in the parish of Bossier and State of Louisiana, have invented certain new and useful Improvements in Cotton-Plows; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
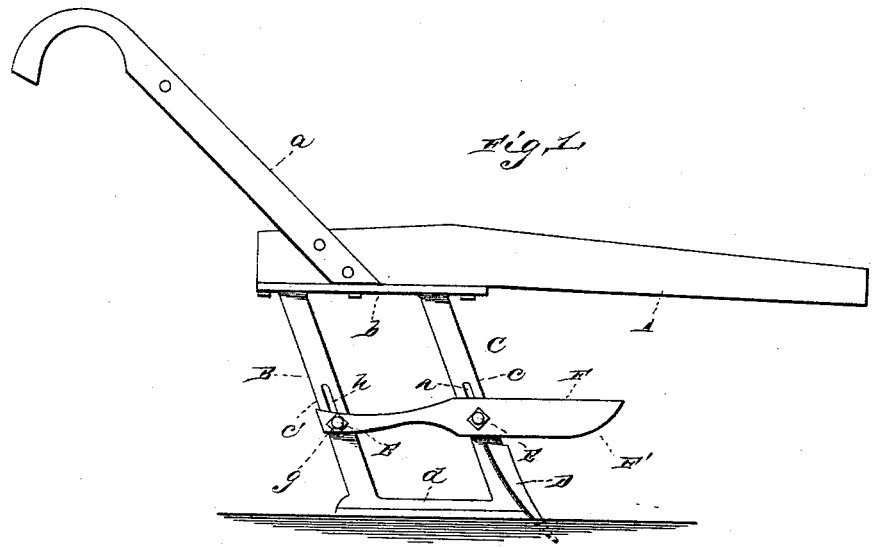
Figure 2:
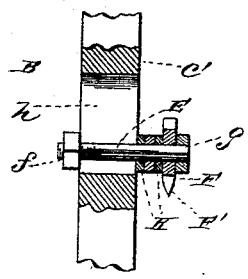

Figure 1 of the drawings is a side view, and Fig. 2 is a detail section.

This invention has relation to plows, and more especially to that class of such instruments known as "cotton-plows."

The object of the invention is to provide a plow of a construction and with such attachments as will render it suitable for "plowing out" cotton before it has become firmly rooted and is liable to be injured either by too deep and close plowing or by becoming covered with soil, it requiring in the ordinary plow a great deal of care and time of the operator in stopping to undo the damage done, which will be to a large extent obviated by the construction hereinafter described.

With this object in view the invention consists in certain novel features of construction, which will hereinafter fully appear.

In the accompanying drawings, illustrating the invention, the letter A represents the beam, having secured thereto the handles $a\,a$ in the usual manner.

The standard B consists of the frame C, secured to the beam and consisting of the top piece $b$, uprights $c\,c'$, and the bottom piece or shoe $d$, which will prevent the share D from going too deeply into the soil. This share D is secured to the front of the upright $c$ of the standard-frame and is made adjustable to a greater or less depth. The uprights $c\,c'$ are each provided with a vertical slot $h$, and in these slots are adjustably held the rods or bolts E E, which support a fender-piece F. These rods or bolts are in their outer ends screw-threaded and receive nuts $f$, which secure the fender-piece in position. The rods or bolts are held at the desired adjustment in the slots $h$ by the nuts $g$ in their outer ends. A series of nuts or washers K are provided between the fender-piece and the uprights, in order that said piece may be adjusted laterally at a greater or less distance from the standards, according to the size of the share used.

The fender-piece F, of metal, is located above the share and is provided with a blade portion F', projecting some distance in front of said share and of sufficient strength and thickness to resist the necessary pressure of the soil. In the case of very young cotton the fender is adjusted at its very lowest point, in order to permit little soil to pass over the share onto the plants; but when the plants are of larger size it is elevated, so as to permit a sufficient quantity to pass over the share to form the hill without covering the plants. It will be seen that this piece may be easily and readily detached if not required for use.

I am aware that it is not new to provide a plow having an adjustable fender, and I do not claim such a plow, broadly; but,

Having thus described my invention, what I claim as new, and desire to secure by Letters Patent, is—

The plow comprising the beam, having rigidly secured thereto the parallel standards provided with vertical slots and connected at their lower ends by the shoe $d$, the share D, adjustably secured to the forward edge of the front standard, and the fender-piece carried by rods or bolts vertically adjustable in said slots, said fender located above the upper end of the share and to one side thereof and having the blade portion F' projecting some distance in front of said share, and means for adjusting said fender laterally on the said rods or bolts toward and away from the said standards, substantially as specified.

In testimony whereof I affix my signature in presence of two witnesses.

JOSEPH J. LEVISTON.

Witnesses:
W. T. NUCKALLS,
W. H. HILL.